United States Patent
Jastrebski et al.

(10) Patent No.: US 9,160,733 B2
(45) Date of Patent: *Oct. 13, 2015

(54) SYSTEM AND METHOD FOR KEY CHALLENGE VALIDATION

(71) Applicant: eBay Inc., San Jose, CA (US)

(72) Inventors: Grahame Andrew Jastrebski, San Jose, CA (US); Dhanurjay A. S. Patil, Atherton, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,911

(22) Filed: Jan. 13, 2014

(65) Prior Publication Data

US 2014/0130141 A1  May 8, 2014

Related U.S. Application Data

(63) Continuation of application No. 11/906,632, filed on Oct. 3, 2007, now Pat. No. 8,631,503.

(51) Int. Cl.
  *G06F 21/00*  (2013.01)
  *H04L 29/06*  (2006.01)
  *G06F 21/36*  (2013.01)

(52) U.S. Cl.
  CPC .............. *H04L 63/08* (2013.01); *G06F 21/36* (2013.01)

(58) Field of Classification Search
  CPC .................................................... H04L 9/3271
  USPC ........................................... 713/182; 726/27
  See application file for complete search history.

(56) References Cited

U.S. PATENT DOCUMENTS

| 4,695,966 A | 9/1987 | Takakura et al. |
| 4,949,391 A | 8/1990 | Faulkerson et al. |
| 5,539,868 A | 7/1996 | Hosoya et al. |
| 6,037,984 A | 3/2000 | Isnardi et al. |
| 6,195,698 B1 * | 2/2001 | Lillibridge et al. ........... 709/225 |
| 6,209,104 B1 | 3/2001 | Jalili |
| 6,209,922 B1 | 4/2001 | Klein |

(Continued)

FOREIGN PATENT DOCUMENTS

| CA | 2569634 C | 5/2012 |
| GB | 2429094 | 2/2007 |

(Continued)

OTHER PUBLICATIONS

"Telling Humans and Computers Apart" Luis von Ahn; 2004 pp. 1-11.*

(Continued)

*Primary Examiner* — Christopher Brown
(74) *Attorney, Agent, or Firm* — Schwegman Lundberg & Woessner, P.A.

(57) ABSTRACT

A system and method for providing key challenge validation is provided. In example embodiments, an initiation of a transaction is detected and a challenge comprising a string of characters is generated based on the detection. The string of characters includes transaction specific information indicating a detail of the transaction. The challenge is presented whereby the string of characters includes a challenge key. A response to the challenge is received that includes the challenge key. In various example embodiments, the transaction is validated based on an identification of the key challenge of the string of characters.

20 Claims, 7 Drawing Sheets

(56) References Cited

U.S. PATENT DOCUMENTS

| | | | |
|---|---|---|---|
| 6,243,093 | B1 | 6/2001 | Czerwinski et al. |
| 6,266,158 | B1 | 7/2001 | Hata |
| 6,292,575 | B1 | 9/2001 | Bortolussi et al. |
| 6,397,355 | B1 | 5/2002 | Curtis et al. |
| 6,618,117 | B2 | 9/2003 | Silverbrook |
| 6,636,216 | B1 | 10/2003 | Silverbrook et al. |
| 6,721,423 | B1 | 4/2004 | Anderson et al. |
| 6,750,944 | B2 | 6/2004 | Silverbrook et al. |
| 6,763,515 | B1 | 7/2004 | Vazquez et al. |
| 6,829,748 | B1 | 12/2004 | Browne et al. |
| 6,868,539 | B1 | 3/2005 | Travison et al. |
| 6,886,863 | B1 | 5/2005 | Mowry, Jr. et al. |
| 6,895,507 | B1 | 5/2005 | Teppler |
| 6,915,409 | B1 | 7/2005 | Peterson |
| 6,947,557 | B1 | 9/2005 | Megiddo et al. |
| 7,139,916 | B2 | 11/2006 | Billingsley et al. |
| 7,149,899 | B2 | 12/2006 | Pinkas et al. |
| 7,200,576 | B2 | 4/2007 | Steeves et al. |
| 7,300,058 | B2 | 11/2007 | Ogilvie |
| 7,383,570 | B2 | 6/2008 | Pinkas et al. |
| 7,454,794 | B1 | 11/2008 | Hibberd |
| 7,770,209 | B2 | 8/2010 | Billingsley et al. |
| 7,891,005 | B1 | 2/2011 | Baluja et al. |
| 8,073,912 | B2 * | 12/2011 | Kaplan .................. 709/206 |
| 8,473,336 | B1 | 6/2013 | Simmons |
| 8,631,467 | B2 | 1/2014 | D'Urso |
| 8,631,503 | B2 | 1/2014 | Jastrebski et al. |
| 2001/0037468 | A1 | 11/2001 | Gaddis |
| 2003/0014412 | A1 | 1/2003 | Collart |
| 2003/0204569 | A1 | 10/2003 | Andrews et al. |
| 2004/0003258 | A1 | 1/2004 | Billingsley et al. |
| 2004/0073813 | A1 | 4/2004 | Pinkas et al. |
| 2004/0199597 | A1 | 10/2004 | Libbey et al. |
| 2005/0052705 | A1 | 3/2005 | Hersch et al. |
| 2005/0065802 | A1 | 3/2005 | Rui et al. |
| 2005/0066201 | A1 | 3/2005 | Goodman et al. |
| 2005/0138376 | A1 | 6/2005 | Fritz et al. |
| 2005/0140675 | A1 | 6/2005 | Billingsley et al. |
| 2005/0198580 | A1 | 9/2005 | Hua et al. |
| 2005/0229251 | A1 | 10/2005 | Chellapilla et al. |
| 2006/0095578 | A1 | 5/2006 | Paya et al. |
| 2006/0136219 | A1 | 6/2006 | Wang |
| 2006/0287963 | A1 | 12/2006 | Steeves et al. |
| 2007/0005500 | A1 | 1/2007 | Steeves et al. |
| 2007/0026372 | A1 | 2/2007 | Huelsbergen |
| 2007/0043681 | A1 | 2/2007 | Morgan et al. |
| 2007/0069008 | A1 * | 3/2007 | Klein et al. .................. 235/379 |
| 2007/0074154 | A1 | 3/2007 | Billingsley et al. |
| 2007/0223779 | A1 | 9/2007 | Curtis |
| 2007/0250920 | A1 | 10/2007 | Lindsay |
| 2008/0016551 | A1 | 1/2008 | Pinkas et al. |
| 2008/0050018 | A1 | 2/2008 | Koziol |
| 2008/0066014 | A1 | 3/2008 | Misra |
| 2008/0072293 | A1 | 3/2008 | D'Urso |
| 2008/0126665 | A1 | 5/2008 | Burr et al. |
| 2008/0209223 | A1 | 8/2008 | Nandy et al. |
| 2009/0077628 | A1 | 3/2009 | Elson et al. |
| 2009/0094687 | A1 | 4/2009 | Jastrebski et al. |
| 2011/0016511 | A1 | 1/2011 | Billingsley et al. |

FOREIGN PATENT DOCUMENTS

| | | |
|---|---|---|
| KR | 808434 | 1/2004 |
| WO | WO-0041103 A1 | 7/2000 |
| WO | WO-2005122453 A1 | 12/2005 |
| WO | WO-2008030363 A2 | 3/2008 |
| WO | WO-2008030363 A3 | 3/2008 |
| WO | WO-2008091675 A1 | 7/2008 |
| WO | WO-2008106032 A2 | 9/2008 |

OTHER PUBLICATIONS

"U.S. Appl. No. 10/186,637, Non-Final Office Action mailed Dec. 19, 2005", 9 pgs.

"U.S. Appl. No. 10/186,637, Notice of Allowance mailed Jul. 21, 2006", 6 pgs.

"U.S. Appl. No. 10/186,637, Response filed Apr. 19, 2006 to Non-Final Office Action mailed Dec. 19, 2005", 15 pgs.

"U.S. Appl. No. 10/863,609 Decision on Appeal mailed Jul. 5, 2011", 11 pgs.

"U.S. Appl. No. 10/863,609, Advisory Action mailed Nov. 16, 2007", 2 pgs.

"U.S. Appl. No. 10/863,609, Appeal Brief filed Mar. 19, 2008", 24 pgs.

"U.S. Appl. No. 10/863,609, Decision on Appeal Brief mailed May 30, 2008", 14 pgs.

"U.S. Appl. No. 10/863,609, Final Office Action mailed Aug. 20, 2007", 13 pgs.

"U.S. Appl. No. 10/863,609, Non-Final Office Action mailed Jan. 17, 2007", 15 pgs.

"U.S. Appl. No. 10/863,609, Non-Final Office Action mailed Jun. 13, 2006", 9 pgs.

"U.S. Appl. No. 10/863,609, Non-Final Office Action mailed Nov. 1, 2005", 11 pgs.

"U.S. Appl. No. 10/863,609, Preliminary Amendment mailed Aug. 24, 2005", 3 pgs.

"U.S. Appl. No. 10/863,609, Response filed Apr. 3, 2006 to Non-Final Office Action mailed Nov. 1, 2005", 11 pgs.

"U.S. Appl. No. 10/863,609, Response filed May 17, 2007 to Non-Final Office Action mailed Jan. 17, 2007", 12 pgs.

"U.S. Appl. No. 10/863,609, Response filed Oct. 13, 2006 to Non-Final Office Action mailed Jun. 13, 2006", 9 pgs.

"U.S. Appl. No. 10/863,609, Response filed Oct. 22, 2007 to Final Office Action mailed Aug. 20, 2007", 7 pgs.

"U.S. Appl. No. 11/515,067 Final Office Action mailed Feb. 7, 2012", 13 pgs.

"U.S. Appl. No. 11/515,067, Examiner Interview Summary mailed May 15, 2012", 3 pgs.

"U.S. Appl. No. 11/515,067, Final Office Action mailed Feb. 22, 2011", 9 pgs.

"U.S. Appl. No. 11/515,067, Non Final Office Action mailed Apr. 8, 2013", 11 pgs.

"U.S. Appl. No. 11/515,067, Non Final Office Action mailed Sep. 20, 2011", 11 pgs.

"U.S. Appl. No. 11/515,067, Non-Final Office Action mailed Sep. 28, 2010", 10 pgs.

"U.S. Appl. No. 11/515,067, Notice of Allowance mailed Sep. 10, 2013", 11 pgs.

"U.S. Appl. No. 11/515,067, Response filed Jan. 19, 2012 to Final Office Action mailed Sep. 20, 2011", 17 pgs.

"U.S. Appl. No. 11/515,067, Response filed May 23, 2011 to Final Office Action mailed Feb. 22, 2011", 11 pgs.

"U.S. Appl. No. 11/515,067, Response filed Jun. 7, 2012 to Final Office Action mailed Feb. 7, 2012", 14 pgs.

"U.S. Appl. No. 11/515,067, Response filed Dec. 21, 2010 to Non Final Office Action mailed Sep. 28, 2010", 11 pgs.

"U.S. Appl. No. 11/515,067, Response filed Aug. 8, 2013 to Non Final Office Action mailed Apr. 8, 2013", 15 pgs.

"U.S. Appl. No. 11/533,250, Non-Final Office Action mailed Aug. 18, 2009", 25 pgs.

"U.S. Appl. No. 11/533,250, Notice of Allowance mailed Mar. 23, 2010", 9 pgs.

"U.S. Appl. No. 11/533,250, Response filed Nov. 18, 2009 to Non Final Office Action mailed Aug. 18, 2009", 13 pgs.

"U.S. Appl. No. 11/679,527, Examiner Interview Summary mailed Mar. 11, 2010", 4 pgs.

"U.S. Appl. No. 11/679,527, Examiner Interview Summary mailed Mar. 24, 2009", 2 pgs.

"U.S. Appl. No. 11/679,527, Final Office Action mailed Jan. 15, 2009", 15 pgs.

"U.S. Appl. No. 11/679,527, Non-Final Office Action mailed Mar. 25, 2008", 9 pgs.

"U.S. Appl. No. 11/679,527, Non-Final Office Action mailed Aug. 21, 2009", 14 pgs.

"U.S. Appl. No. 11/679,527, Response filed May 15, 2009 to Final Office Action mailed Jan. 15, 2009", 10 pgs.

(56) References Cited

OTHER PUBLICATIONS

"U.S. Appl. No. 11/679,527, Response filed Sep. 25, 2008 to Non-Final Office Action mailed Mar. 25, 2008", 13 pgs.
"U.S. Appl. No. 11/906,632 , Response filed Jun. 13, 2012 to Final Office Action mailed Mar. 15, 2012", 12 pgs.
"U.S. Appl. No. 11/906,632 , Response filed Dec. 29, 2011 to Non Final Office Action mailed Aug. 31, 2011", 12 pgs.
"U.S. Appl. No. 11/906,632, Final Office Action mailed Mar. 15, 2012", 7 pgs.
"U.S. Appl. No. 11/906,632, Non Final Office Action mailed Feb. 20, 2013", 9 pgs.
"U.S. Appl. No. 11/906,632, Non Final Office Action mailed May 17, 2011", 8 pgs.
"U.S. Appl. No. 11/906,632, Non Final Office Action mailed Dec. 14, 2010", 10 pgs.
"U.S. Appl. No. 11/906,632, Non Final Office Action mailed Aug. 31, 2011", 8 pgs.
"U.S. Appl. No. 11/906,632, Notice of Allowance mailed Sep. 10, 2013", 13 pgs.
"U.S. Appl. No. 11/906,632, Response filed May 20, 2013 to Non Final Office Action mailed Feb. 20, 2013", 14 pgs.
"U.S. Appl. No. 11/906,632, Response filed Aug. 16, 2011 to Final Office Action mailed May 17, 2011", 12 pgs.
"U.S. Appl. No. 11/906,632, Response filed Mar. 14, 2011 to Non Final Office Action mailed Dec. 14, 2010", 10 pgs.
"U.S. Appl. No. 12/848,895 , Response filed May 17, 2012 to Non Final Office Action mailed Feb. 22, 2012", 11 pgs.
"U.S. Appl. No. 12/848,895, Non Final Office Action mailed Feb. 22, 2012", 12 pgs.
"U.S. Appl. No. 12/848,895, Notice of Allowance mailed Aug. 21, 2012", 6 pgs.
"U.S. Appl. No. 12/848,895, Preliminary Amendment filed Sep. 29, 2010", 9 pgs.
"Canadian Application Serial No. 2,569,634 , Notice of Allowance mailed Dec. 9, 2011", 1 pg.
"Canadian Application Serial No. 2,569,634, Response filed Feb. 25, 2011 to Non Final Office Action mailed Aug. 26, 2010", 11 pgs.
"Canadian Application Serial No. 2,569,634, Response filed Aug. 29, 2011 to Office Action mailed Mar. 7, 2011", 3 pgs.
"Canadian Application Serial No. 2569634, Office Action mailed Aug. 26, 2010", 4 pgs.
"Canadian Application Serial No. 2,569,634, Office Action mailed Mar. 7, 2011", 3 pgs.
"CAPTCHA", From Wikipedia, the free encyclopedia, [Online]. Retrieved from the Internet: <URL: http://en.wikipedia.org/wiki/CAPTCHA>, (Aug. 21, 2006), 4 pgs.
"Chinese Application Serial No. 0381538.X, Response filed Jun. 25, 2009 to Office Action mailed Apr. 10, 2009", with English translation of claims, 16 pgs.
"Chinese Application Serial No. 03815384.X, Office Action Mailed Apr. 10, 2009", 5 pgs.
"Chinese Application Serial No. 03815384.x, Office Action mailed Jul. 11, 2006", with English translation of claims, 13 pgs.
"Chinese Application Serial No. 03815384.x, Office Action received Apr. 10, 2009", with English translation of claims, 9 pgs.
"Chinese Application Serial No. 03815384.X, Response filed Dec. 12, 2006 to Office Action mailed Sep. 1, 2006", with English translation of claims, 23 pgs.
"Chinese Application Serial No. 200480043752.0, International Search Report mailed Mar. 21, 2005", 6 pgs.
"Chinese Application Serial No. 200480043752.0, Office Action mailed Oct. 26, 2011", with English translation of claims, 17 pgs.
"Chinese Application Serial No. 200480043752.0, Office Action Mailed Nov. 20, 2009", with English translation of claims, 18 pgs.
"Chinese Application Serial No. 200480043752.0, Office Action Response Filed Jun. 7, 2010", with English translation of claims, 9 pgs.
"Chinese Application Serial No. 200480043752.0, Office Action Response filed Sep. 27, 2011", 3 pgs.
"Chinese Application Serial No. 200480043752.0, Response filed Jan. 9, 2012 to Office Action mailed Oct. 26, 2011", 4 pgs.
"Chinese Application Serial No. 200480043752.0, Second Office Action mailed Jul. 20, 2011", With English Translation, 16 pgs.
"European Application Serial No. 03762197.6, Summons to Attend Oral Proceedings mailed Oct. 25, 2012", 5 pgs.
"European Application Serial No. 03762197.6, Office Action mailed Jan. 2, 2008", 4 pgs.
"European Application Serial No. 03762197.6, Office Action mailed Mar. 7, 2012", 5 pgs.
"European Application Serial No. 03762197.6, Office action Mailed Dec. 17, 2008", 3 pgs.
"European Application Serial No. 03762197.6, Office Action Response Filed Sep. 14, 2012", 11 pgs.
"European Application Serial No. 03762197.6, Response filed Apr. 27, 2009 to Office Action mailed Dec. 17, 2008", 18 pgs.
"European Application Serial No. 03762197.6, Response filed Jul. 14, 2008 to Office action mailed Jan. 2, 2008", 11 pgs.
"European Application Serial No. 03762197.6, Supplemental Search Report Oct. 9, 2007", 4 pgs.
"European Application Serial No. 04780519.7, Decision to Refuse Application mailed Dec. 12, 2011", 10 pgs.
"European Application Serial No. 04780519.7, Office action Mailed Jan. 22, 2009", 5 pgs.
"European Application Serial No. 04780519.7, Office Action Response May 22, 2009", 2 pgs.
"European Application Serial No. 04780519.7, Search Report mailed Mar. 21, 2005", 6 pgs.
"European Application Serial No. 04780519.7, Summons to attend Oral Proceeding mailed Jul. 13, 2011", 8 pgs.
"History—First Use—Alta-Vista", Parc Captcha, [Online]. Retrieved from the Internet: <URL: http://www2.parc.com/istl/projects/captcha/history.htm>, (2003), 3 pgs.
"Indian Application Serial No. 1983/KOLN/2004, Response filed Feb. 21, 2007 to Examiner Report mailed Jul. 28, 2006", 50 pgs.
"Indian Application Serial No. 1983/KOLN/2004, Response Filed Aug. 19, 2009 to Examiners report mailed Feb. 16, 2009", 14 pgs.
"Indian Application Serial No. 1983/KOLNP/2004 First Examiner's Report mailed Jul. 28, 2006", 23 pgs.
"Indian Application Serial No. 1983/KOLNP/2004, Office Action mailed Feb. 16, 2009", 1 pg.
"International Application Serial No. PCT/US03/20457, International Preliminary Examination Report mailed Mar. 3, 2005", 4 pgs.
"International Application Serial No. PCT/US03/20457, International Search Report mailed Oct. 3, 2003", 4 pgs.
"International Application Serial No. PCT/US03/20457, Written Opinion mailed Jul. 29, 2004", 4 pgs.
"International Application Serial No. PCT/US04/25695, International Search Report and Written Opinion mailed Mar. 21, 2005", 9 pgs.
"International Application Serial No. PCT/US04/25695, International Search Report mailed Mar. 21, 2005", 4 pgs.
"International Application Serial No. PCT/US04/25695, Written Opinion mailed Mar. 21, 2005", 3 pgs.
"International Application Serial No. PCT/US07/18907, International Preliminary Report on Patentability mailed Mar. 12, 2009", 7 pgs.
"International Application Serial No. PCT/US07/18907, International Search Report mailed Mar. 17, 2008", 4 pgs.
"International Application Serial No. PCT/US07/18907, Written Opinion mailed Mar. 17, 2008", 5 pgs.
"International Application Serial No. PCT/US2004/025695, Corrected International Search report mailed Mar. 21, 2005", 2 pgs.
"International Application Serial No. PCT/US2004/025695, Corrected Written Opinion mailed Mar. 21, 2005", 3 pgs.
"International Application Serial No. PCT/US2004/025695, International Preliminary Report on Patentability mailed Dec. 21, 2006", 5 pgs.
"International Application Serial No. PCT/US2008/002208, International Preliminary Report on Patentability mailed Sep. 11, 2009", 9 pgs.
"International Application Serial No. PCT/US2008/002208, International Search Report mailed Aug. 18, 2008", 5 pgs.

(56) References Cited

OTHER PUBLICATIONS

"International Application Serial No. PCT/US2008/002208, Written Opinion mailed Aug. 18, 2008", 6 pgs.

"Korean Application Serial No. 2004-7021494, Amendment filed Oct. 27, 2006", with English translation of claims, 55 pgs.

"Korean Application Serial No. 2007-7000370, Decision from the Patent Tribunal of the KIPO mailed Feb. 19, 2010", with English translation of claims, 15 pgs.

"Korean Application Serial No. 2007-7000370, Decision on Appeal mailed May 17, 2011", with English translation of claims, 39 pgs.

Korean Application Serial No. 2007-7000370, Office Action mailed Feb. 19, 2008.

"Korean Application Serial No. 2007-7000370, Office Action mailed Aug. 18, 2008", with English translation of claims, 5 pgs.

"Korean Application Serial No. 2007-7000370, Response filed May 19, 2008 to Office Action mailed Mar. 3, 2008", with English translation of claims, 38 pgs.

"Microsoft Press Computer Dictionary, Third Edition", The Comprehensive Standard for Business, School, Library, and Home, (1997), 3 pgs.

"Session Hijacking", Imperva Inc., [Online]. Retrieved from the Internet: <URL: http://www.imperva.com/application_defense_center/glossary/session_hijacking.html>, (2006), 2 pgs.

"The Chaptcha Project: Telling Humans and Computers Apart (Automatically)", [Online]. Retrieved from the Internet: <URL: http://www.captcha.net/>, (May 2, 2005), 3 pgs.

"The Chaptcha Project: Telling Humans and Computers Apart (Automatically)", [Online]. Retrieved from the Internet: <URL: http://web.archive.org/web/20020529145520/http://www.captcha.net/>, (Archived May 29, 2002), 3 pgs.

Adnan, Masood, "15 Seconds : Fighting Spambots with NET and AI", [Online]. Retrieved from the Internet: <URL: http://www.15seconds.com/Issue/040202.htm>, (Feb. 2, 2004), 16 pgs.

Baird, H. S, et al., "Human Interactive Proofs and Document Image Analysis", Lecture Notes in Computer Science, Document Analysis Systems V, vol. 2423/2002, (2002), 531-537.

Baird, H. S, et al., "Human Interactive Proofs and Document Image Analysis", In Proceedings of the 5th International Workshop on Document Analysis Systems V, vol. 2423,, (Aug. 19-21, 2002), 507-518 pgs.

Baird, Henry S, et al., "Protecting Websites with Reading-Based CAPTCHAs", 2nd International Web Document Analysis Workshop (WDA'03), (Aug. 3, 2003), 53-56.

Brelstaff, Gavin, et al., "Practical application of visual illusions: errare humanum est", ACM International Conference Proceeding Series; vol. 95 Proceedings of the 2nd symposium on Applied perception in graphics and visualization., (2005), 161-161.

Chellapilla, K., et al., "Building segmentation based human-friendly human interaction proofs (HIPs)", Lecture notes in computer science, Human interactive proofs. International workshop No. 2, Bethlehem PA, (2005), 1-27.

Chellapilla, K., et al., "Computers beat Humans at Single Character Recognition in Reading based Human Interaction Proofs (HIPs).", CEAS 2005, Conference on Email and Anti-Spam 2005, (2005), 1-8.

Chellapilla, K., et al., "Designing human friendly human interaction proofs (HIPs)", Proceedings of the SIGCHI conference on Human factors in computing systems, (2005), 711-720.

Chellapilla, K., et al., "Using Machine Learning to Break Visual Human Interaction Proofs (HIPs)", Advances in Neural Information Processing Systems 17, Neural Information Processing Systems (NIPSÂ?2004), (2004), 1-8.

Chew, M., et al., "Image Recognition CAPTCHAs", EECS Department, University of California, Berkeley, Technical Report No. UCB/CSD-04-1333, (2004), 1-19.

Chew, Monica, et al., "BaffleText: a human interactive proof (5010-40)", Document recognition and retrieval-Annual conference; 10th Proceedings SPIE the International Society for Optical Engineering, (2003), 305-316.

Coates, A., et al., "Pessimal Print: A Reverse Turing Test", Proceedings of the Sixth International Conference on Document Analysis and Recognition (ICDAR), (2001), 1-5.

Courter, Gini, et al., Mastering Microsoft (R) Office 2000 Professional Edition, San Francisco : Sybex Inc., (1999), pp. 5-7, 70-71, 151-157.

Imberman, Susan P., et al., "Three fun assignments for an Artificial Intelligence Class", Journal of Computing Sciences in Colleges, 21(2), (2005), 113-118.

Matthias, Colin E., et al., "Blocking Techniques Against Malicious Robots", Major Qualifying Project Report submitted to the Faculty of the Worcester Polytechnic Institute, (Mar. 7, 2003), 1-39.

Mori, G, et al., "Recognizing objects in adversarial clutter: breaking a visual CAPTCHA", Proceedings. IEEE Computer Society Conference on Computer Vision and Pattern Recognition, vol. 1,, XP010644891, (Jun. 2003), 134-141.

Naor, Moni, "Verification of a human in the loop or Identification via the Turing Test", Unpublished draft, [Online]. Retrieved from the Internet: <URL: http://www.wisdom.weizmann.ac.il/~naor/PAPERS/ human abs.html>, (1996), 6 pgs.

Simard, P. Y., et al., "Using Character Recognition and Segmentation to Tell Computer From Humans", Proceedings of the Seventh International Conference on Document Analysis and Recognition (ICDAR 2003), [Online]. Retrieved from the Internet: <URL: http://www.csc.liv.ac.uk/~prima/ICDAR2003/Papers/0077_680_simard_p.pdf>, (2003), 6 pgs.

Spice, Byron, "Robot Solves Internet Robot Problem", Pittsburgh Post-Gazette, http://www.postgazette.com/healthscience/20011102lblumside1021p4.asp, (Oct. 21, 2001), 3 pages.

Von Ahn, Luis, et al., "CAPTCHA: Using Hard AI Problems for Security", Proceedings of Eurocrypt, (2003), 294-311.

Von Ahn, Luis, "Telling Humans and Computers Apart (Automatically) or How Lazy Cryptographers do AI", Communications of the ACM, 47(2), (Feb. 2004), 56-60.

Xu, J, et al., "Mandatory human participation: a new authentication scheme for building secure systems", The 12th International Conference on Computer Communications and Networks, 2003. ICCCN 2003. Proceedings., XP010695028, (Oct. 2003), 547-552.

\* cited by examiner

SYSTEM AND METHOD FOR KEY CHALLENGE VALIDATION

PRIORITY

This application is a continuation of and claims the benefit of priority under to U.S. patent application Ser. No. 11/906,632, filed on Oct. 3, 2007, which is hereby incorporated by reference herein in its entirety.

TECHNICAL FIELD

This patent document pertains generally to transaction systems and more particularly, but not by way of limitation, to a system and methods for key challenge validation.

BACKGROUND

An electronic transaction system may facilitate transactions between the parties of a transaction. Some electronic transaction systems facilitate transactions made over the Internet.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

DETAILED DESCRIPTION OF EXAMPLE EMBODIMENTS

Overview

Figure 1:
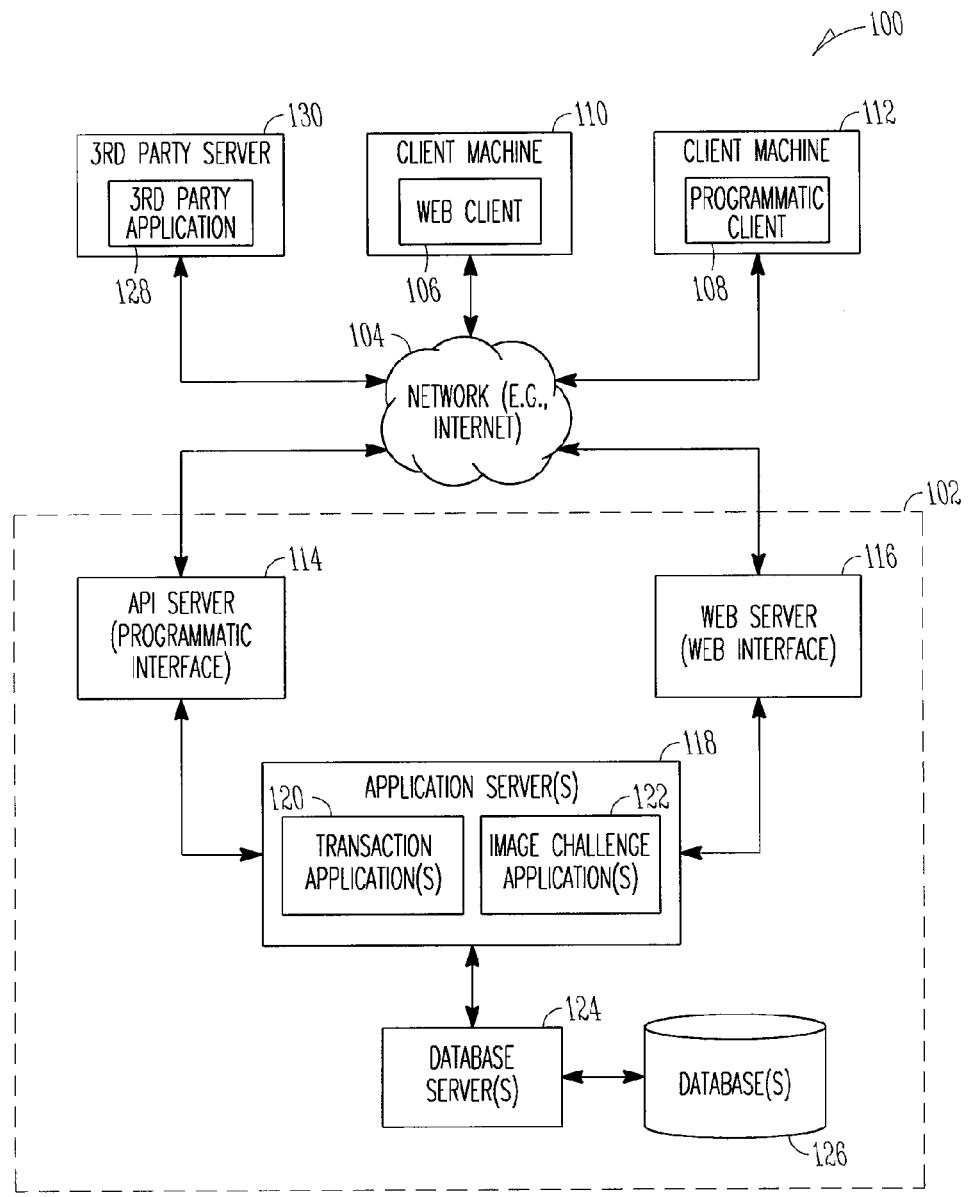
FIG. 1 is a block diagram illustrating a system 100, using a client-server architecture, according to an example embodiment.

Example embodiments described herein include detecting an initiation of a transaction and generating a string of characters in response to the detection. A portion of the string of characters may be made to be visually distinguishable from a different portion of the string. Various embodiments include challenging the transaction initiator to identify a specified portion of the string of characters. In some embodiments, a transaction may be validated if the specified portion of the string is identified.

This overview is intended to provide an overview of the subject matter of the present patent application. It is not intended to provide an exclusive or exhaustive explanation. The detailed description is included to provide further information about the subject matter of the present patent application.

Parties intent on committing fraud may deploy a man-in-the-middle (MITM) attack on a transaction. In a MITM attack, an attacker (e.g., malicious code) typically intercepts communications between the parties of a transaction, changes subject matter and/or the recipient(s) of the transaction, and forwards a forged message to a party of the transactions without either party knowing that communications have been compromised.

A completely automated public Turing test to tell computers and humans apart (CAPTCHA) may be used to protect against MITM attacks (e.g., including forged messages) by malicious software code. A conventional CAPTCHA is a visual challenge presented to a user via user interface (e.g., a Web page). CAPTCHAS work by embedding a secret key into an image. To meet the visual challenge, the secret key must be extracted from the image. The characters (e.g., a string of random characters) presented by a CAPTCHA are designed to be difficult for malicious software code to recognize but are usually easy for a human to recognize. Thus, before an electronic transaction system will accept the validity of certain communications (e.g., communications associated with a transaction) from a party to a transaction, a CAPTCHA string must be correctly re-entered into a text box to prove that the source of the message is human.

Another form of a MITM attack includes an unauthorized party removing a CAPTCHA from the Web page upon which it was deployed and placing the CAPTCHA on a different Web page where it may be solved by human users. Once solved, the CAPTCHA may be placed back onto the original Web page and fraudulently used to authenticate a human user.

Various example embodiments describe a system and methods for challenging an initiator of a transaction with an image that includes visual distinguishable characters. In example embodiments, validation of the transaction may depend on a user's ability to identify certain characters that have been chosen by the system as part of a key.

A challenge string module may generate the string of characters in response to an initiation of a transaction. Initiation of a transaction may include a user's interaction with a Web page, such as clicking on a link to submit a transaction, or other interaction, etc. The character string may take different forms. Example character strings may have a fixed or variable length and characters may be either randomly or purposefully selected. Some example character strings represent information that is specific to the transaction being initiated (e.g., e-mail addresses of sender and/or recipient, name of sender and/or recipient and/or any other transaction specific information, etc.).

A key generation module may select the key (e.g., a portion of the string of characters to be visually distinguished from a different portion of the string of characters). Some example embodiments include an image attribute module that provides different visual attributes that may be assigned to an image containing the character string. Example image attribute modules may be used to visually distinguish the key characters from the other characters in the string with distinguishers such as colors, fonts, patterns, shading, and/or any other visual attribute, etc.

A challenge generation module may generate an image that includes the entire string. The characters composing the key may be adjacent to one another or their relative positions may be randomly selected. In some example embodiments, the image is displayed on a Web page viewable by the initiator of the transaction. Some example challenge generation modules may also generate explicit instructions for identifying the key (e.g., identifying the specified visually distinguishable portion of the character string). Other example embodiments rely on the initiator of the transaction to identify the key implicitly (e.g., by selecting the only shaded characters from a string consisting of shaded and un-shaded characters).

In example embodiments, a processor may validate the transaction based on a visual identification of the key. Example processors may compare a set of characters entered in a text box (e.g., entered by a user who initiated or requested the transaction) with the actual key (e.g., the specified portion of the string of characters) and validate the transaction if the match (e.g., confirm that a user is human if they match)

This overview is intended to provide an overview of the subject matter of the present patent application. It is not intended to provide an exclusive or exhaustive explanation.

Example Embodiments

The following detailed description includes references to the accompanying drawings, which form a part of the detailed description. The drawings show, by way of illustration, example embodiments in which the subject matter may be practiced. These embodiments, which are also referred to herein as "examples," are described in enough detail to enable those skilled in the art to practice the subject matter. The embodiments may be combined, other embodiments may be used, or structural, logical, and electrical changes may be made without departing from the scope of the present subject matter. The following detailed description is, therefore, not to be taken in a limiting sense, and the scope of the present subject matter is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

FIG. 1 is a block diagram illustrating a system 100, using a client-server architecture, according to an example embodiment. A network-based publication system 102 (e.g., a network-based commerce system facilitating transactions between multiple sellers and multiple buyers) provides server-side functionality, via a network 104 (e.g., the Internet) to one or more clients, such as a Web client 106 (e.g., a browser, such as the Internet Explorer browser developed by Microsoft Corporation of Redmond, Wash. or the FireFox browser provided by Mozilla Corporation of Mountain View, Calif.), and a programmatic client 108 executing on respective client machines 110 and 112. An Application Program Interface (API) server 114 and a Web server 116 may be coupled, and provide program and Web interfaces respectively, to one or more application servers 118.

The Web client 106 may access the various commerce and image applications 120 and 122 via the Web interface supported by the Web server 116. In an example embodiment, the buyer using Web client 106 submits searches for items and browses the electronic marketplace for items via the network 104 and the Web server 116.

Similarly, the programmatic client 108 can access the various services and functions provided by the commerce and image applications 120 and 122 via the program interface of the API server 114. The programmatic client 108 may, for example, comprise a seller application to enable sellers to submit listings to the commerce system 102 and receive recommended publication data in return.

The application servers 118 may host one or more transaction applications 120 and image applications 122. The application servers 118 may, in turn, be coupled to one or more database servers 124 that facilitate access to one or more databases 126. In example embodiments, the modification module 307 and the storage module 309 as described with respect to FIG. 3 may be included within the transaction applications 120, the database server 124 and the databases 126.

The transaction applications 120 provide a number of commerce functions and services to users that access the commerce system 102. The image challenge applications 122 likewise provide image challenges to users to protect transactions from being compromised. While the commerce and image applications 120 and 122 shown in FIG. 1 form part of the network-based commerce system 102, it will be appreciated that, in some embodiments of the subject matter, the image applications 122 may form part of an image service that is separate and distinct from the commerce system 102. The various commerce and image applications 120 and 122 can also be implemented as standalone software programs with or without individual networking capabilities.

A third-party application 128 executing on a third-party server machine 130 may also have programmed (e.g., computer-implemented) access to the network-based commerce system 102 via the program interface of the API server 114. For example, the third-party application 128 may, using information retrieved from the network-based commerce system 102, support one or more features or functions on a Web site hosted by the third party. The third-party Web site may, for example, provide one or more promotional, commerce, or payment functions that are supported by the relevant applications of the network-based commerce system 102.

Figure 2:
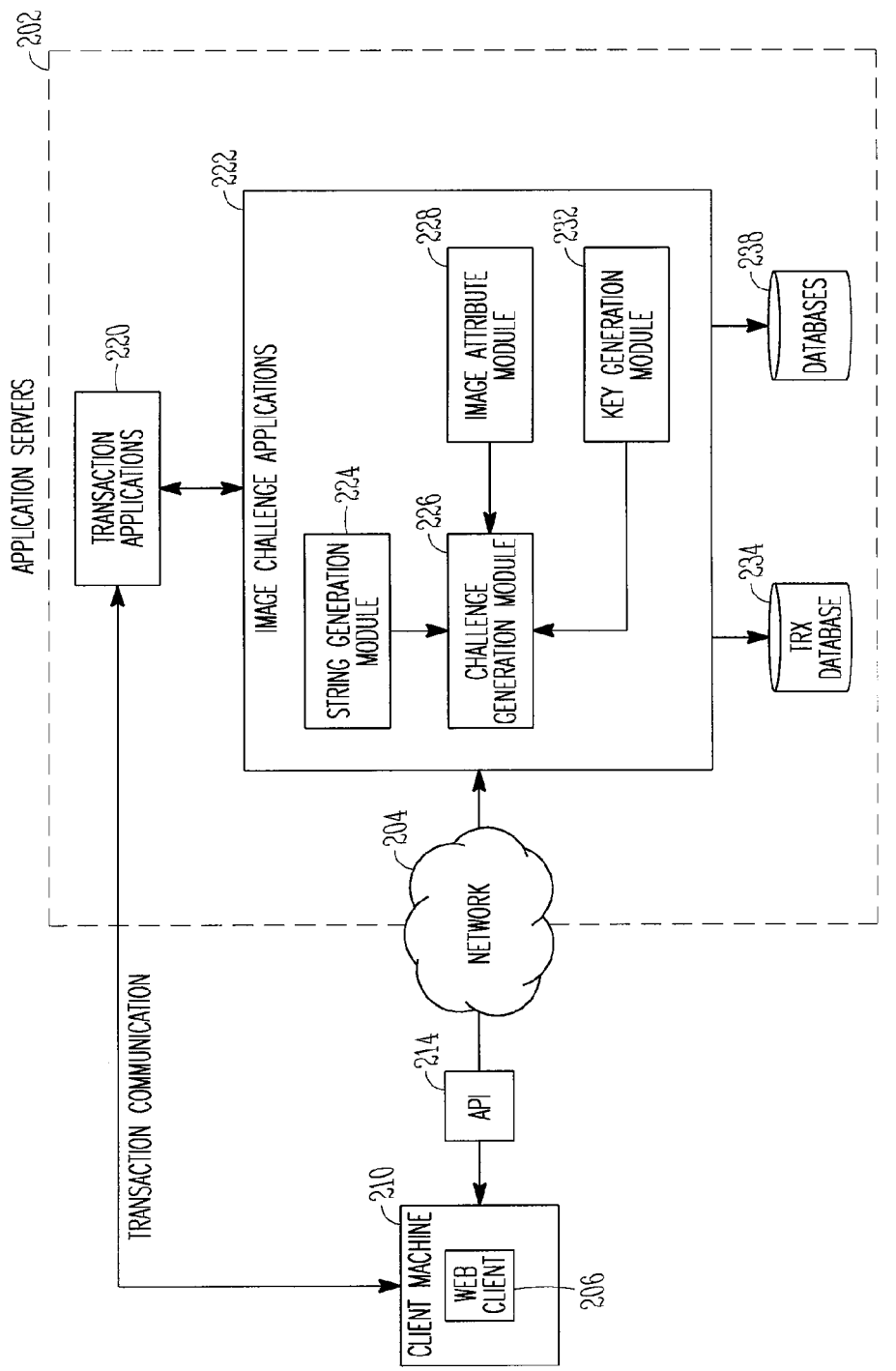
FIG. 2 is a block diagram illustrating a client machine communicatively coupled with an electronic transaction system, in accordance with an example embodiment.

FIG. 2 is a block diagram illustrating a client machine 210 communicatively coupled with an electronic transaction system 202, in accordance with an example embodiment. As described with respect to the client machine 110 of FIG. 1, the client machine 210 accesses the transaction applications 220 via the network and the API.

Communication between the client machine 210 and the transaction applications 220 may be associated with transactions (e.g., payments, transfer of data and/or exchange of information, etc.). Example transactions may include but are not limited to payments of currency and/or other valuables, the transfer of data and/or exchange of information, confirmation of an order, confirmation of a payment, and/or any other transaction associated with the submission and/or receipt of specific information.

Data entry forms (e.g., including text boxes) and displays (e.g., dialogue boxes) (not shown) may be presented to the client machine 210 via the Web client 206. The interactions between the Web client 206 and the transaction applications 220 are to be discussed in further detail below.

The transaction applications 220 may communicate with the challenge image applications 222. In general, communications between the transaction applications 220 and the challenge image applications 222 support their coordination to produce challenge images (discussed below) corresponding to the transactions they are to protect.

The image challenge applications 222 may be communicatively coupled with databases 238 to access information associated with image challenges. In various example embodiments, one or more of the image challenge applications 222 may detect that a transaction has been initiated and begin generating an image challenge based on the detection. In an example embodiment, initiation of a transaction includes submission of a Web form via the Web client 206 of the client machine 210. The initiation of a transaction may cause the one or more challenge image applications 222 to begin preparation of the image challenge with which to challenge a user, in order to confirm an identity of the user (e.g., that the user is a human and not malicious code).

Figure 5:
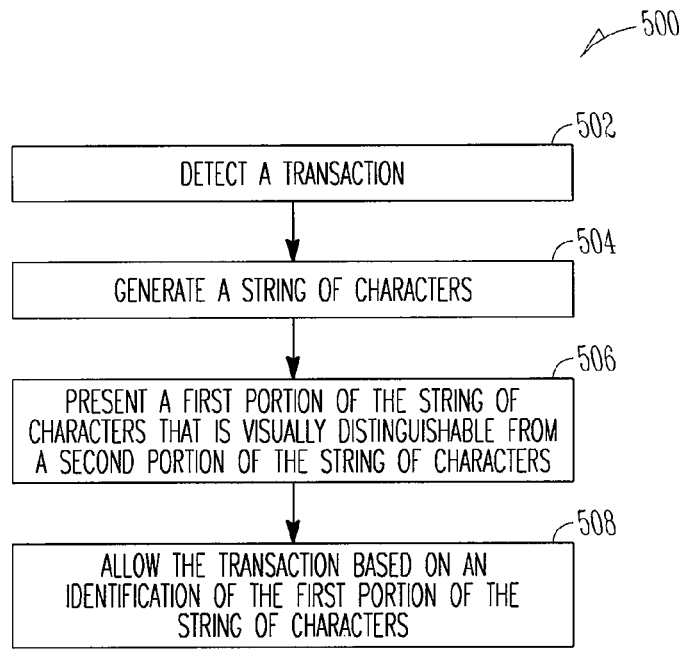
FIG. 5 is a flow diagram illustrating a method for challenging a user, in accordance with an example embodiment.

In an example embodiment, one of the image challenge applications 222 (e.g., the challenge string generation module 224) detects an initiation of a transaction and begins the challenge generation process (see FIG. 5 showing an example image generation process).

Each of the modules described in FIG. 2 may implement logic constructed to provide certain functionality associated with each module. In example embodiments, the modules may either implement their respective logic with software, hardware, or a combination of software and hardware. In example embodiments, image challenge applications 222 are software instructions to be processed with a processor (not shown).

The image attribute module 228 is to define the image (e.g., the background, foreground, and boundaries) and/or the character images that are displayed by a Web client (e.g., the Web client 206). Image attributes may include values that define the footprint (e.g., the area and/or size of an underlying image), the color, pattern, shading, resolution, and/or any other attributes of an image and/or characters that may be included within an image. In an example embodiment, the image attribute module 228 includes one or more interfaces (not shown) to enable communication with the challenge generation module 226.

In some example embodiments, the string generation module 224 may generate a challenge string including a string of randomly selected characters in accordance with a CAPTCHA challenge (see FIG. 3 discussed below for example challenge string).

In various example embodiments, the string generation module 224 generates a string that may be recognizable (e.g., by a human user of the client machine) as being transaction specific information (described in further detail below with respect to FIG. 6). In such embodiments, the string generation module 224 may obtain transaction specific information from the transaction database 234 to which it is communicatively coupled.

In example embodiments, the transactional information is associated with the particular transaction from the perspective of the transaction applications 220. For example, image challenge applications 222 may identify a recipient or details of the transaction. Transaction information may be associated with a payment recipient, a transaction amount, a shipping address or a portion of a contract or agreement. The information associated with the payment recipient may be an e-mail address, an account identifier, or a personal identification number of a recipient of the transaction.

Some example string generation modules 224 select transaction information from the transaction database 234. In another example embodiment, the string generation module 224 includes logic to intelligently identify the most relevant details of a transaction from transactional details entered by the user, from the perspective of the transaction applications 220. For example, the string generation module 224 may identify the name or e-mail address of the recipient of a transaction. Also, the string generation module 224 may identify the clause in a contract or agreement that lists the parties to the contract as the most relevant information and select that portion as the transaction information.

The key generation module 232 is to select a subset of the challenge string to be used as a secret key. A user who is presented with the string in an image challenge may be requested to identify the secret key to solve the challenge.

In an example embodiment, the key generation module 232 is limited to selecting a key having a fixed number of characters. In other example embodiments, the number of characters defining a key may vary between a predetermined minimum and maximum number of characters. The number of characters defining the key may be different for different challenges. In various embodiments, once the number of characters to make up the key has been determined, the actual characters included in the key may be randomly selected.

The challenge generation module 226 may include one or more interfaces to receive input from the string generation module 224, the image attribute module 228, and the key generation module 232. The challenge generation module 226 is to combine the output of the different modules described above to generate an image challenge that is to be presented via the Web client 206 (e.g., to a user of the client machine 210).

In an example embodiment, the process of generating an image challenge is initiated when the Web client 206 requests a transaction form from transaction applications 220. Once the transaction form is requested, the transaction applications 220 may correspond with the image challenge applications 222 to request the generation of an image challenge.

Figure 3:
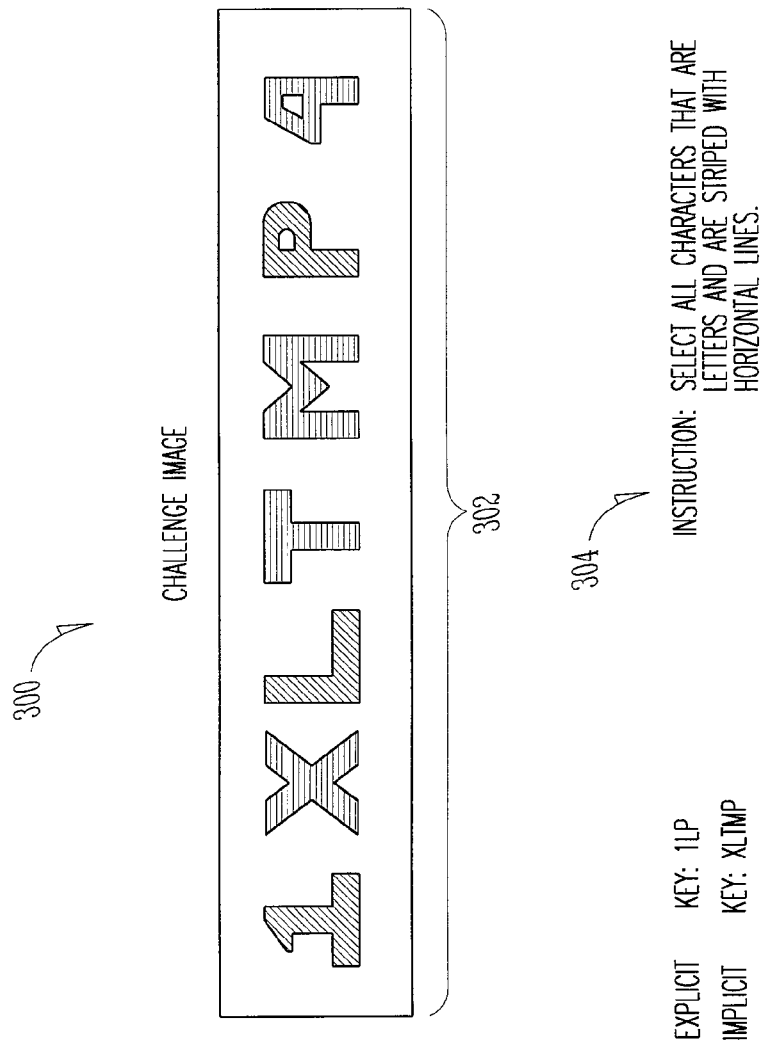
FIG. 3 is a block diagram illustrating an image challenge including a challenge string, according to an example embodiment.

In an example embodiment, the challenge generation module 226 is to apply the image attributes (e.g., size, color, pattern, etc.) to the challenge string and the selected key to present the combination as a single challenge image (e.g., see FIG. 3). The challenge generation module 226 may include an interface to provide the image challenge to the challenge image database 234 that may store the challenge image so it may later be compared with attempts to solve the challenge.

In an example embodiment, the challenge generation module 226 is to render the image including the challenge string and the challenge key in accordance with the inputs from the image attribute module 228. The rendered image may be presented as a challenge via the Web client 206.

It is to be understood that many additional image processing techniques may be applied to challenge images to make it more difficult for software (e.g., malicious software) to extract the challenge key. The techniques may include but are not limited to applying visual effects backgrounds, applying additional visual elements to the image (e.g., lines, shapes, etc.), and applying visual noise, distortions, transformations and/or other visual effect, etc.

As described above, the image challenge applications 222 may access databases 238 for information associated with an image challenge. The databases 238 may be include various tables to organize the information.

The following is a high-level description, explaining various tables that may be maintained within the database and that are used by and support the image challenge applications. A reference sequence table contains a record of reference sequences generated by the challenge generation module and may include time/stamp information pertaining to each reference sequence.

The tables also include a character table in which are maintained all characters that may be selected to generate a visual challenge. Likewise, a number table and symbol table maintain respectively all numbers and symbols that may be selected to generate a visual challenge. It will be appreciated that the items in the character table, number table, and symbol table may be maintained not to include characters, numbers, or symbols that may be too difficult to recognize by a human once distorted or modified. For example, punctuation marks such as "." or "," may be excluded from the symbol table.

Multiple characters (e.g., letters, numbers and/or symbols) may be selected from the character table, number table, and symbol table randomly, to form the reference sequence stored in the reference sequence table.

A visual challenge table contains a record of visual challenges generated by the challenge generation module 226, e.g., the reference sequences after they have been distorted and modified and may also include time/stamp information pertaining to each reference sequence. A font type table contains records of the different font types that may be used to randomly modify each character in a reference sequence to form a visual challenge. In one embodiment, the font sets are handmade by humans and stored in a font library for retrieval each time a font is requested. Each font set may comprise a plurality of font images as described in more detail below. Similarly, a font size table contains the allowable font sizes that may be used to size each glyph that forms part of the reference sequence. Other tables, such as an orientation table, placement table, spacing table, and vertical offset table respectively contain information on the parameters to randomly select the orientation of a character in an image challenge, the placement of each character, the spacing between characters and the vertical offset of each character within the image challenge.

Various tables may be maintained within the transactional database 234 and may be used by and support the image challenge applications 222. An identifier table may maintain information on the following identifier data groups: recipient identifiers, recipient account identifiers, recipient shipping details, contract information, and agreement information.

Similar to the tables that may be maintained within the databases 238, the tables may also include a size table to maintain information on the allowable sizes for the transactional information, a location table to maintain information on the possible placements of the transaction information within the image, and an orientation table to maintain information on the orientation of the transaction information within the image. A repetition table provides information on the number of times a particular transactional information may be displayed. As the number of presentations may be closely related to the selected size of transaction information, the size table and repetition table may be linked.

FIG. 3 is a block diagram illustrating an image challenge 300 including a challenge string 302, according to an example embodiment. The challenge string 302 may have been generated by the string generation module 224 of FIG. 2. In an example embodiment, the challenge string 302 consists of seven alphanumeric characters that were randomly selected by the string generation module 224. As shown in FIG. 3, the challenge string 302 is shown to include the character string: "1XLTMP4".

The challenge string 302 may be presented by a browser (e.g., the Web client 206 of FIG. 2) in any of a variety of orientations. In an example embodiment, the challenge string 302 is rendered along a horizontal line. Alternatively or additionally, the challenge string 302 may be oriented in such a way that the beginning and the end of the challenge string are joined together. In some example embodiments, the challenge string is rendered along an arbitrary path (e.g., a wave or a triangular path).

As described above, to solve an image challenge, a challenge key must first be identified in the challenge string. A challenge key may include characters that are set apart from the other characters of a challenge string in any of a number of ways. In an example embodiment, the characters belonging to the challenge key are highlighted using a color that differs from the remaining characters. The characters belonging to the key may be shaped or emphasized in a manner that differs from the remaining characters and/or may include patterns that differ from the remaining characters (e.g., the font of character may visually set it apart from other characters).

A challenge key may be identified to the user implicitly (e.g., without further instructions) or explicitly (e.g., with further instructions). In cases that the challenge key is identified explicitly, the key generation module may generate instructions associated with the challenge key to be included in the challenge image.

In an example embodiment, a three character key is to be identified to solve an image challenge. Referring to FIG. 3, a human may be likely to select "1LP" as the key because those characters are the only characters within the challenge string that are shaded. In this example embodiment, the challenge key may be implicitly identified because a human may be likely to select the shaded characters as the challenge key.

In other example embodiments, the length of the key to solving an image challenge is not stated. However, explicit instructions 304 may be included with the challenge string, instructing a user to enter all the characters that are both letters and are striped with horizontal lines. Here, the challenge may be solved by identifying the characters, "XM".

For some example keys, the key generation module 232 of FIG. 2 may select characters that are purposefully made adjacent to one another within the challenge string 302. In other example embodiments, characters for the key are selected randomly and need not be located adjacent to one another.

It is to be appreciated that a number of challenge keys (e.g., that may be difficult for a malicious software code to solve or reproduce) may be generated based on combinations of the various variable values associated with the challenge string 302 and the challenge key. Different forms of challenge images 300 may be rotated to further thwart attempts by malicious code to solve the challenge image 300.

Thus, the challenge string module 224 may generate a string of characters in response to a request to make a transaction. Some example challenge string modules 224 detect the request by detecting a user's interaction with a Web page (e.g., a click on a button to initiate a transaction). The key generation module 232 may select one portion of the string of characters that is to be made visually distinguishable from another portion of the string of characters. In various example embodiments, string of characters generated by the string generation module 224 is a string of randomly selected characters having a fixed length.

Example embodiments include an image attribute module 228 that visually distinguishes the first portion of the string from the second portion of the string by providing the image with one or more visual attribute. Example image attribute module 228 provides distinguishers such as colors, fonts, patterns, and shading that are applied as attributes for the image.

The challenge generation module 226 may then generate an image that includes the first and second portion of the string. Some example challenge generation modules 226 may generate instructions to be used to identify the first portion of the string of characters (e.g., select all the blue letters horizontally striped). In some example embodiments, the image generated by the challenge generation module 226 presents a portion (e.g., the key) of the string of characters as characters adjacent to one another. In other example embodiments, the image generated by the challenge generation module 226 presents the portion of the string (e.g., the key) as characters randomly located with respect to one another.

In example embodiments, the processor 240 may then validate the transaction based on an identification of the first portion of the string. Some example processors validate the transaction by comparing a set of characters entered in a text box (e.g., by a user initiating the transaction) with a portion of the string of characters (e.g., the key), and confirming that a user is human if the set of characters (e.g., the characters entered by the user) and the first portion (e.g., the key) match.

Figure 4:
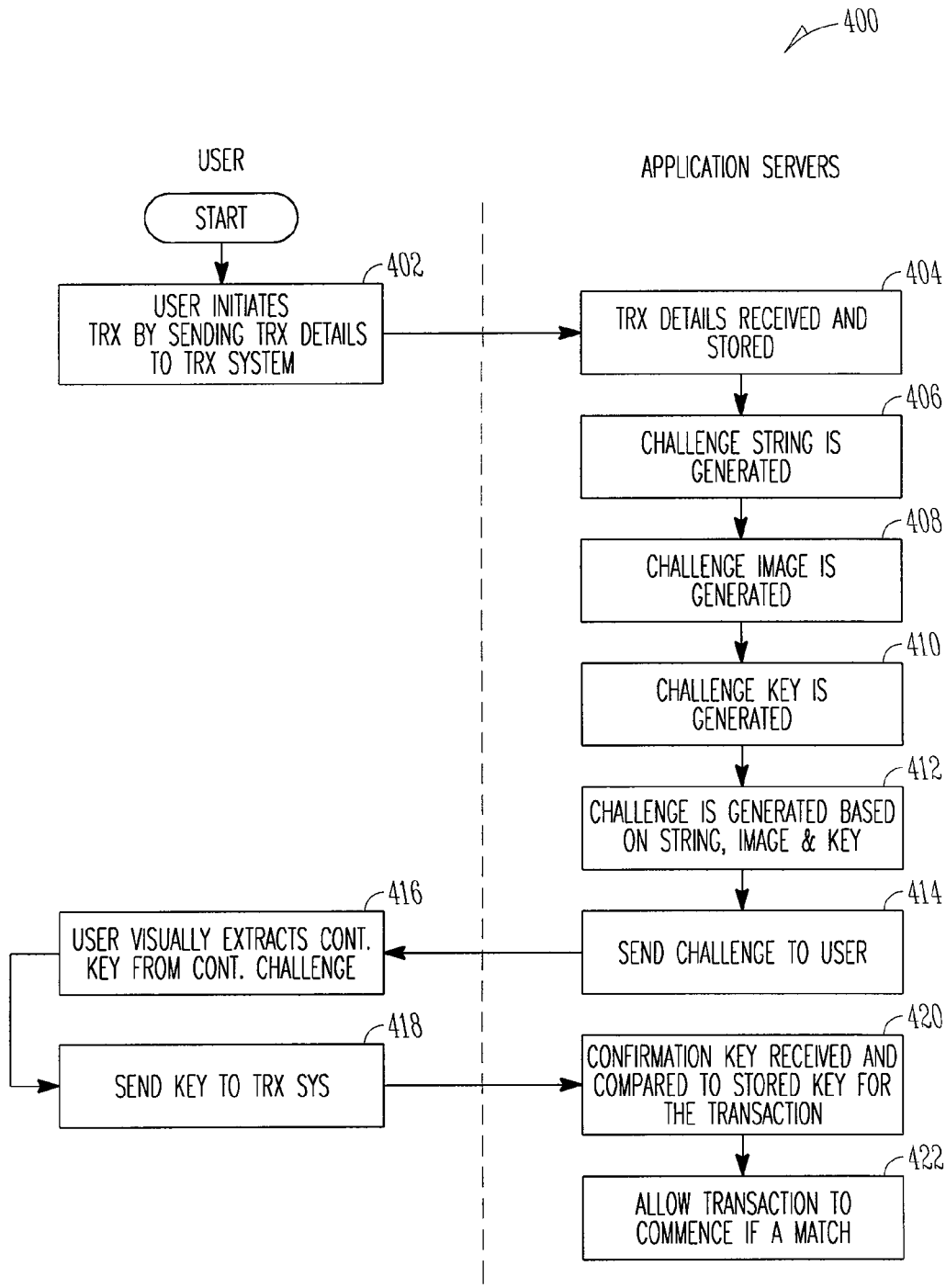
FIG. 4 is a flow diagram showing a communication process between a user and application servers, in accordance with an example embodiment.

FIG. 4 is a flow diagram 400 showing a communication process 400 between a user and application servers (e.g., 118 of FIG. 1) in accordance with an example embodiment. The process begins at block 402 with the user initiating a transaction by sending transaction details to transaction applications (e.g., 220 of FIG. 2). In an example embodiment, transaction details may include information such as the names and e-mail addresses of the sender and recipient as well as an amount of money to be transacted. It is to be appreciated that any transaction may the example embodiment described herein and a transaction including money need not be made.

The process continues at processing block 404 with the transaction applications receiving the transaction details and storing them (e.g., within the transaction databases 234 of FIG. 2) for later use. The generation of the challenge may then begin at processing block 406. In an example embodiment, the image challenge applications 222 of FIG. 2 may begin generating the image challenge based on the initiation of the transaction sent by the user. Some example image challenge applications 222 detect the initiation of the transaction via an indication from the transaction applications 220. Creation of the image challenge may include generating the challenge string, image challenge, and a challenge key at processing blocks 406, 408, and 410 respectively. In an example embodiment, the challenge string, image challenge, and challenge key are combined at processing block 412 where the challenge to be displayed is generated and stored for later reference (within e.g., the challenge image databases 238).

At processing block 414, processing logic may send the challenge to the user to enforce a policy (e.g., an authentication policy, validation of a transaction or any other policy, etc.). The user may perceive the image challenge at block 416 and visually extract the challenge key by perceiving a difference (e.g., implicitly or through instructions) between the some of the characters. In example embodiment, the user may send the challenge key to the image challenge applications at block 418. At processing block 420, the image challenge applications may receive the challenge key offered by the user and compare it to the challenge key previously stored. If the offered challenge key matches, at processing block 422, the stored challenge key, processing logic may allow the initiated transaction to commence.

FIG. 5 is a flow diagram illustrating a method for challenging a user, in accordance with an example embodiment. The method begins at processing block 502 with the detection of a transaction. In an example embodiment, processing logic may detect the initiation of a transaction by a user (e.g., a user of the client machine 210 of FIG. 2).

The method continues at block 504 with processing logic generating a string of characters. The string of characters may be presented within a single image or as more than one image. Various example embodiments include the generation of the string occurring in response to the detection of the transaction. At block 506, processing logic may present a first portion (e.g., a challenge key) of the string of characters that is visually distinguishable from a second portion (e.g., the remaining characters in the character string) of the string of characters. In some embodiments, both portions of the characters are presented in an image rendered as the challenge image.

The method concludes at block 508 with processing logic allowing the transaction to proceed based on an identification of the first portion (e.g., the challenge key) of the string of characters.

Figure 6:
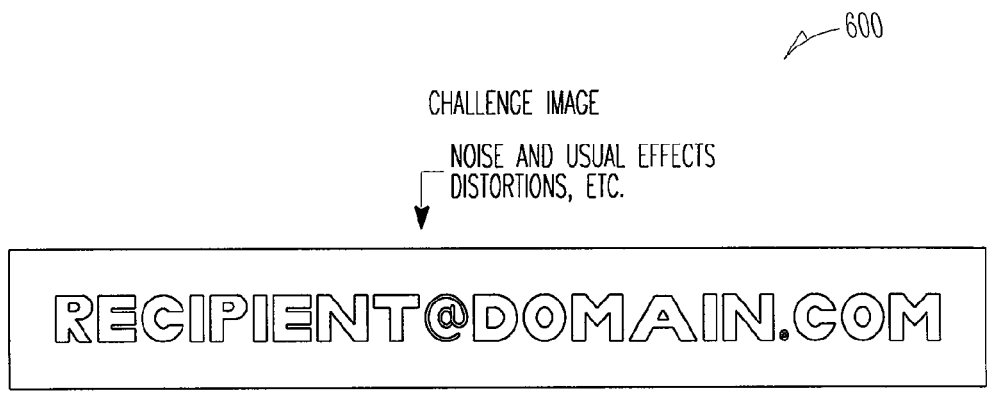
FIG. 6 is a block diagram illustrating an image challenge that includes transaction information, in accordance with an example embodiment.

FIG. 6 is a block diagram illustrating an image challenge 600 that includes transaction information, in accordance with an example embodiment.

Malicious code may attempt to forge a CAPTCHA in order to solicit a human user to solve the challenge so that the solved challenge can be used fraudulently on another Web site (e.g., the user may be e.g., ignorant of the circumstances). The string generation module 224 of FIG. 2 may generate a challenge string 602 that is specific to the transaction being initiated and that is recognizable by a human user as being specific to the transaction.

The challenge string 602 may include one or more references to the transaction currently in progress. In this example, the challenge string is the e-mail address of a user who is a party of the transaction. Malicious code may not have access to transaction specific information (e.g., stored within the transaction database 234 of FIG. 2). Thus, malicious code may have significant difficulty forging an image challenge 600 that includes transaction specific information challenge string 302.

In an example embodiment, a user may be presented with an image challenge 600 that includes a challenge string 602 representing transaction specific information. Where a user recognizes the transaction information as being related to the subject transaction, the user may be assured that it would be safe to solve the challenge and proceed with the transaction. Conversely, where the user does not recognize the character string as being transaction specific, the user may be alerted to a possibly fraudulent challenge image 600 generated by malicious code and may abort any plans to solve the challenge and proceed with the transaction.

Where a transaction to send money from a sender to a recipient is initiated, a reference to the transaction may include the recipient's e-mail address and/or name. Alternatively or additionally, the reference to the transaction may include the sender's e-mail address and/or name. It is to be appreciated that any transaction specific information known to one or more of the parties of the transaction may be used in a challenge string 602 including transaction related information. The key generation module 232 may select a key based on the characters in the transaction related string in the same manner as described above with respect to a conventional CAPTCHA string of random characters.

Thus, the string of characters generated by the string generation module 224 may represent information that is specific to the initiated transaction (e.g., by a user of the client machine 210 via the Web client 206). In various example embodiments, the string generation module 224 may generate transaction specific information or data such as recipient names, e-mail addresses of the recipient, sender names, and or e-mail addresses of the sender.

Figure 7:
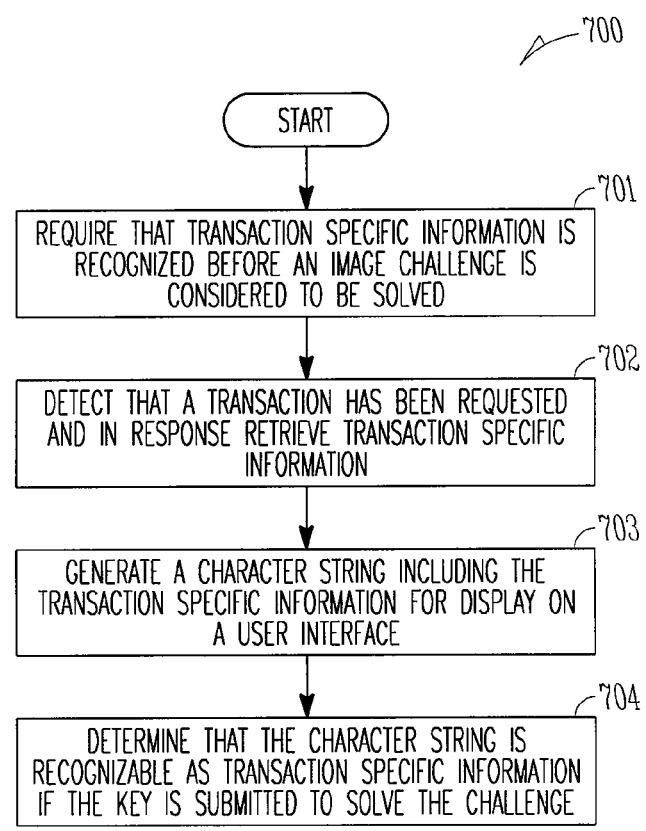
FIG. 7 is a flow chart illustrating a method, in accordance with an example embodiment for stopping a proposed invalid transaction.

FIG. 7 is a flow chart illustrating a method 700 in accordance with an example embodiment for stopping a proposed invalid transaction. The method begins at block 701 with processing logic requiring that transaction specific information is recognized before an image challenge is considered to be solved. At block 702, processing logic may detect that a transaction has been requested and, in response, retrieve transaction specific information. At processing block 703, a character string including the transaction specific information may then be generated and displayed on a user interface. In various example embodiments, a portion of the character string includes a key that corresponds to a visually distinguishable portion or portions of the character string. The process concludes at block 704 with processing logic determining that the character string is recognizable as transaction specific information if the key is submitted to solve the challenge.

With a fraudulently generated image challenge, malicious code could wait for the challenge to be solved by a user and then process unwanted transactions after the user and/or transaction has been validated. Example embodiments describing transactional challenge images 600 using a challenge key are described above. Through example embodiments describing a transaction specific character string within a challenge image, a user may be able stop proposed invalid transactions, which may prevent malicious code from using a fraudulently generated image challenge.

Figure 8:
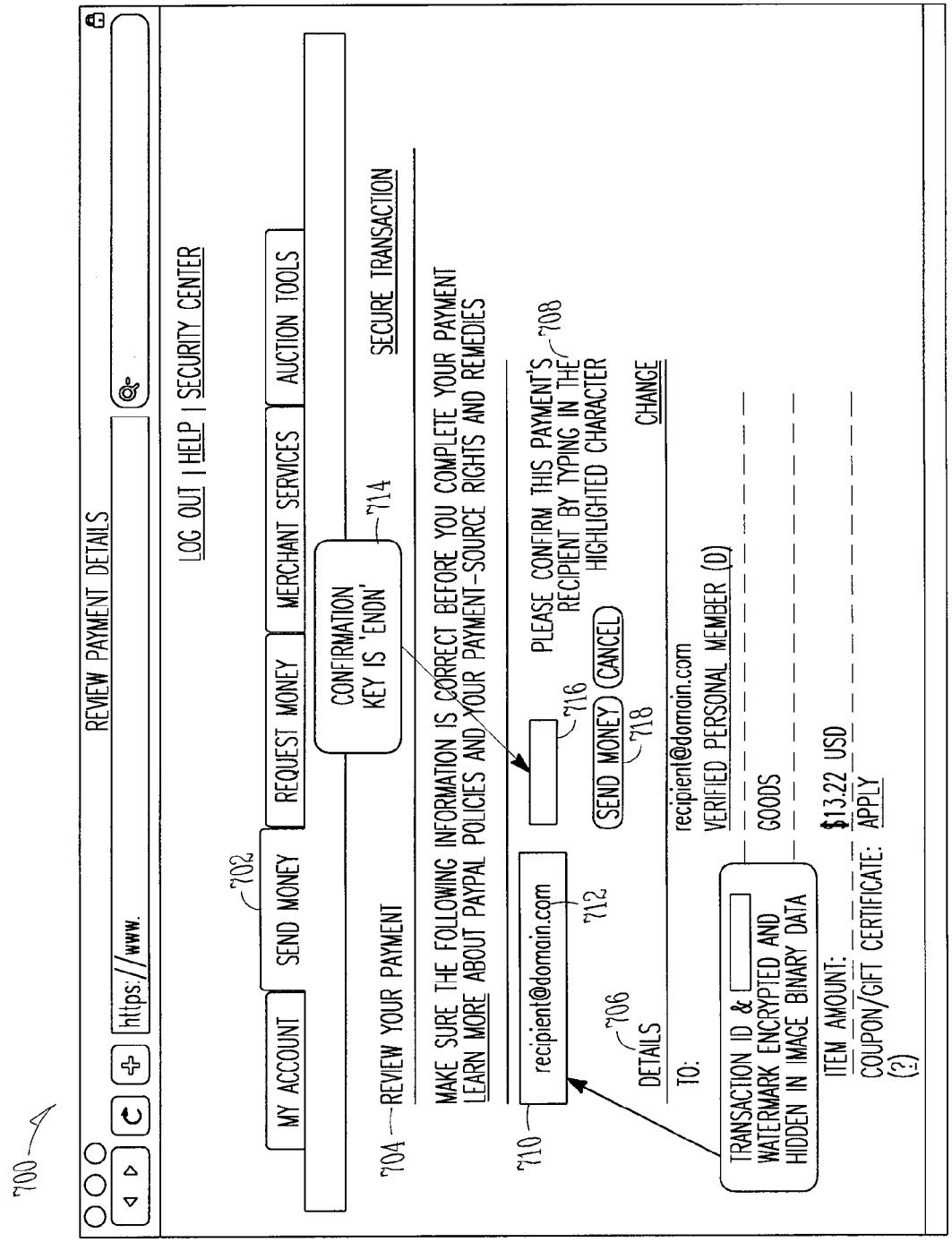
FIG. 8 is an example Web client user interface displaying an example Web page, in accordance with an example embodiment.

FIG. 8 is a example Web client user interface 800 displaying an example Web page in accordance with an example embodiment. The example user interface 800 shows a "review your payment" page 804 associated with the selection of the "send money" tab 802. On the example "review your payment" page, a user (e.g., a user of the client machine 210) is given a chance to review the details 806 of a transaction in which the user wishes to send money to another user (e.g., the user of the client machine 212). In an example embodiment, the details section 806 indicates that $13.22 is to be sent to recipipient@domain.com.

In an example embodiment, prior to sending the $13.22, the user is to follow the directions 808 which request the user to "Please confirm this payment's recipient (e.g., as indicated in the details 806 section) by typing in the highlighted characters." In some embodiments, the instructions refer to the challenge image 810. As described above, the challenge image 810 may include a character string 812. As in the example shown, the character string 812 may be rendered in the form of a wave. Alternatively or additionally, the characters string 812 may include rendering in other visually noticeable forms. In an example embodiment, the challenge key 814 is explicitly identified by the instructions because the instructions tell the user to type in the highlighted characters. In other embodiments, the challenge key 814 may be implicitly identified (e.g., "please confirm this payment's recipient by typing in the confirmation key.") In various embodiments, the payment transaction will be inhibited by transaction applications 220 unless the payment's recipient is confirmed by typing the highlighted characters 814 into the text box 816.

In FIG. 8, the challenge key 814 is shown as the characters "ENDN" because they are of a different shade than the remaining characters of the character string 812. Once the challenge key in typed in by the user, a selection of the send money button 818 to complete the transaction will not be inhibited due to a failure to confirm the recipient.

It is to be noted that the character string 812 is also the e-mail address of the user to which the money is to be sent. In various embodiments, a transaction specific character string 812 may provide confirmation to a sending user that the transaction is associated with the sending user. In an example embodiment, a sending user is deterred from proceeding with a transaction when the character string 812 is not recognizable as being associated with an expected transaction.

The above description is intended to be illustrative and not restrictive. For example, the above-described embodiments (or one or more aspects thereof) may be used in combination with each other. Other embodiments will be apparent to those of skill in the art upon reviewing the above description. The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
    detecting an initiation of a transaction;
    retrieving transaction specific information indicating a detail of the transaction in response to detecting the initiation of the transaction, the detail of the transaction being recognizable as being specific to the transaction;
    generating a challenge including a challenge image comprising a string of characters that includes the detail of the transaction;
    presenting the challenge with an indication to return a challenge key, the challenge key being a visually distinguished portion of the string of characters that includes the detail of the transaction;
    receiving a response to the challenge, the response including the challenge key; and
    validating, using a processor of a machine, the transaction based on the response including the challenge key.

2. The method of claim 1, wherein the indication to return the challenge key comprises at least one selection from the group comprising instructions and a text box.

3. The method of claim 1, wherein the detail of the transaction included in the string of characters comprises a selection from a group consisting of a recipient name, a first e-mail address of the recipient, a sender name, a second e-mail address of the sender, a transaction amount, a shipping address, and a portion of a contract.

4. The method of claim 1, wherein the presenting the challenge further comprises visually distinguishing the portion of the string of characters to indicate the challenge key.

5. The method of claim 4, wherein the visually distinguishing includes using at least one visual distinguisher selected from a group consisting of colors, fonts, patterns, and shading.

6. The method of claim 4, wherein the visually distinguishing comprises presenting characters of the challenge key non-contiguously in the string of characters.

7. The method of claim 1, wherein the presenting the challenge comprises presenting characters of the challenge key contiguously in the string of characters.

8. The method of claim 1, further comprising providing instructions to return the challenge key in response to the challenge by entering the challenge key in a text box.

9. The method of claim 1, wherein the validating the transaction comprises comparing a set of characters entered in a text box with the challenge key and confirming that a user is human based on the set of characters matching the challenge key.

10. The method of claim 1, wherein the transaction specific information indicating the detail of the transaction that becomes the challenge key is retrieved from a transaction database.

11. A system comprising:
a string generation module to retrieve transaction specific information indicating a detail of a transaction in response to detecting an initiation of the transaction, and to generate a challenge including a challenge image comprising a string of characters that includes the detail of the transaction, the detail of the transaction being recognizable as being specific to the transaction;
a key generation module to select a challenge key using the string of characters that includes the detail of the transaction;
a challenge generation module to generate an image that presents the challenge key as a visually distinguished portion of the string of characters that includes the detail of the transaction; and
a hardware processor configured to validate the transaction based on a response including the challenge key.

12. The system of claim 11, further comprising an image attribute module to provide a visual attribute to the image to visually distinguish the portion of the string of characters as the challenge key.

13. The system of claim 11, wherein the challenge generation module visually distinguishes by presenting characters of the challenge key non-contiguously in the string of characters.

14. A machine-readable storage medium not having transitory signals and storing instructions which, when executed by the at least one processor of a machine, cause the machine to perform operations comprising:
detecting an initiation of a transaction;
retrieving transaction specific information indicating a detail of the transaction in response to detecting the initiation of the transaction, the detail of the transaction being recognizable as being specific to the transaction;
generating a challenge including a challenge image comprising a string of characters that includes the detail of the transaction;
presenting the challenge with an indication to return a challenge key, the challenge key being a visually distinguished portion of the string of characters that includes the detail of the transaction;
receiving a response to the challenge, the response including the challenge key; and
validating the transaction based on the response including the challenge key.

15. The machine-readable storage medium of claim 14, wherein the indication to return the challenge key comprises at least one selection from the group consisting of instructions and a text box.

16. The machine-readable storage medium of claim 14, wherein the detail of the transaction included in the string of characters comprises a selection from a group consisting of a recipient name, a first e-mail address of the recipient, a sender name, a second e-mail address of the sender, a transaction amount, a shipping address, and a portion of a contract.

17. The machine-readable storage medium of claim 14, wherein the presenting the challenge further comprises visually distinguishing the portion of the string of characters to indicate the challenge key.

18. The machine-readable storage medium of claim 17, wherein the visually distinguishing the challenge key comprises presenting characters of the challenge key non-contiguously in the string of characters.

19. The machine-readable storage medium of claim 14, wherein the presenting the challenge comprises presenting characters of the challenge key contiguously in the string of characters.

20. The machine-readable storage medium of claim 14, wherein the validating the transaction comprises comparing a set of characters entered in a text box with the challenge key and confirming that a user is human based on the set of characters matching the challenge key.

* * * * *